(12) United States Patent
White et al.

(10) Patent No.: US 7,904,656 B1
(45) Date of Patent: Mar. 8, 2011

(54) CONTROLLER FOR HARD DISK DRIVE HAVING DWFT (DATA WEDGE FORMAT TABLE) CACHE WITH HIGH-PRIORITY INITIAL CACHE FILL

(75) Inventors: Theodore White, Rancho Santa Margarita, CA (US); William Dennin, III, Mission Viejo, CA (US); Lim Hudiono, Laguna Niguel, CA (US)

(73) Assignee: Marvell International Ltd., Hamilton (BM)

( * ) Notice: Subject to any disclaimer, the term of this patent is extended or adjusted under 35 U.S.C. 154(b) by 569 days.

(21) Appl. No.: 12/031,644

(22) Filed: Feb. 14, 2008

Related U.S. Application Data

(60) Provisional application No. 60/889,815, filed on Feb. 14, 2007.

(51) Int. Cl.
*G06F 12/06* (2006.01)

(52) U.S. Cl. ............... 711/118; 711/112; 360/51; 360/69

(58) Field of Classification Search .................. None
See application file for complete search history.

(56) References Cited

U.S. PATENT DOCUMENTS

| | | | | |
|---|---|---|---|---|
| 6,710,960 B1 * | 3/2004 | Yorimitsu | ............ | 360/69 |
| 6,748,486 B2 * | 6/2004 | Burton et al. | ............ | 711/112 |
| 7,609,468 B2 * | 10/2009 | Pinvidic et al. | ............ | 360/51 |
| 2006/0227447 A1 * | 10/2006 | Pinvidic et al. | ............ | 360/51 |

* cited by examiner

*Primary Examiner* — Than Nguyen

(57) ABSTRACT

A controller and a method for interfacing with a storage medium. Access to a buffer memory via a multi-channel bus is arbitrated. DWFT (Data Wedge Format Table) entries stored in the buffer memory are read and cached in a DWFT cache memory. Data is transferred to and from the storage medium through a storage medium interface. The storage medium interface accesses the sectors of the storage medium based on their physical locations, as defined by the cached DWFT entries. The multi-channel bus includes a DWFT channel to which DWFT cache circuitry is connected. In a DWFT tenure, the DWFT cache circuitry reads the DWFT entries stored in the buffer memory, and caches the DWFT entries in the DWFT cache memory.

21 Claims, 10 Drawing Sheets

DWFT CACHE FILL FLOW

CONTROLLER FOR HARD DISK DRIVE HAVING DWFT (DATA WEDGE FORMAT TABLE) CACHE WITH HIGH-PRIORITY INITIAL CACHE FILL

CROSS-REFERENCE TO RELATED APPLICATION

This application claims the benefit of U.S. Provisional Patent Application No. 60/889,815, filed Feb. 14, 2007, the contents of which are hereby incorporated by reference as if fully stated herein.

FIELD

The present disclosure relates generally to storage devices, and particularly to a hard disk drive controller having a DWFT (Data Wedge Format Table) cache with high-priority initial cache fill.

BACKGROUND

FIG. 1 illustrates a conventional hard disk drive 1500. Hard disk drive 1500 includes a hard disk controller 1502 that controls the transfer of data between a storage medium 1506 (e.g., a surface of a magnetic disk) and a host 1503 (e.g., a computer). Hard disk controller 1502 typically includes a host interface 1508 for communicating with host 1503, a storage medium interface 1507 for writing data to and reading data from storage medium 1506, and a memory controller 1501 for controlling access to memory 1509 via a multi-channel bus 1504.

Memory 1509 functions as a cache for information to and from host 1503, and as temporary storage for data being written to or read from storage medium 1506. Hard disk controller 1502 arbitrates access to memory 1509 typically through time division delegation of access to the memory to plural different circuitry, each of which accesses the memory 1509 on behalf of a client. As one example, there is channel zero (CH0) circuitry for performing a CH0 process to access memory 1509 on behalf of storage medium 1506.

FIG. 2 is a time-line illustrating a conventional arbitration scheme performed by hard disk controller 1502. Hard disk controller 1502 uses an arbitration algorithm to prevent different processes from simultaneously accessing memory 1509 through a given channel. Within each arbitration round-trip, each channel (of the multi-channel bus) is assigned a "tenure" (or time period) during which a corresponding process may access memory 1509 through the channel. After the tenure of a given channel expires, the corresponding process does not access memory 1509 until the next arbitration round-trip. FIG. 2 depicts example tenures, 110 to 115, in one arbitration round-trip. Each of tenures 110 to 115 represents a maximum amount of time during which a process may access memory 1509 through a channel. Typically, the CH0 process bursts data—i.e., transfers data to/from memory 1509—corresponding to one sector of storage medium 1506 during a tenure associated with the CH0 process.

In an index-less hard disk drive (e.g., hard disk drive 1500), each data wedge of a storage medium (e.g., storage medium 1506) can contain any number of sectors, and each sector can span multiple data wedges. A Data Wedge Format Table (DWFT) is typically used to determine where each sector is located on a storage medium. The DWFT can be large, and is typically stored in a buffer memory (e.g., memory 1509). Before accessing a sector within a data wedge of the storage medium, a storage medium interface (e.g., storage medium interface 1507) reads a corresponding DWFT entry from the buffer memory to determine the location of sectors within the data wedge.

SUMMARY

Storing a DWFT in a buffer memory has not been a problem in conventional hard disk drives, in which the CH0 tenure bursts only a single sector of disk data. However, the inventors herein recently proposed an advanced storage device controller in which, during the CH0 tenure, there is a burst of more than one sector of disk data. See U.S. application Ser. No. 11/872,673, "Controller for Storage Device with Improved Burst Efficiency", the entire contents of which are incorporated by reference as if set forth in full herein. Because more than one sector of disk data is burst, the fact that the DWFT is stored in buffer memory can hinder performance in some applications. The embodiments of the present invention address the foregoing by caching DWFT entries into a DWFT cache memory accessible by CH0 circuitry.

Thus, in one example embodiment, a controller for interfacing with a moving storage medium partitioned into multiple data wedges and sectors is provided. The controller includes a buffer controller for arbitrating access to a buffer memory via a multi-channel bus. Data is transferred to and from the storage medium through a storage medium interface. The storage medium interface includes DWFT (Data Wedge Format Table) cache circuitry. The DWFT cache circuitry has a DWFT cache memory for caching DWFT entries. The storage medium interface accesses the sectors of the storage medium based on their physical locations, as defined by the cached DWFT entries. The multi-channel bus includes a DWFT channel to which the DWFT cache circuitry is connected. In a DWFT tenure for the DWFT channel, a DWFT process performed by the DWFT cache circuitry reads DWFT entries stored in the buffer memory, and caches the DWFT entries in the DWFT cache memory.

Because multiple DWFT entries are cached, a DWFT entry for the next sector of a multi-sector burst can be available in time for the next sector access. In this manner, delays in accessing DWFT entries during CH0 multi-sector bursts may be reduced, thereby improving hard disk performance.

The multi-channel bus can include a CH0 channel to which CH0 circuitry is connected. In a CH0 tenure for the CH0 channel, a CH0 process performed by the CH0 circuitry can access the buffer memory on behalf of the storage medium, and transfer data between the storage medium and the buffer memory. An arbitration priority of the DWFT tenure can be configurable so that for an initial filling of the DWFT cache memory, the arbitration priority of the DWFT tenure can be higher than an arbitration priority of the CH0 tenure. After the DWFT tenure ends, the arbitration priority of the CH0 tenure can be a highest priority.

Ordinarily, the buffer controller arbitrates access to the buffer memory in sequential tenures to each channel of the multi-channel bus within an arbitration round-trip time.

An arbitration priority of the DWFT tenure can be configurable so that for an initial filling of the DWFT cache memory, the DWFT tenure can have a high arbitration priority, and after the initial filling, the DWFT tenure can have a normal arbitration priority. The DWFT cache circuitry can have a disabled state and an enabled state. The initial filling of the DWFT cache memory can begin when the DWFT cache circuitry enters the enabled state and reads DWFT entries from the buffer memory, and the initial filling can end when the DWFT cache memory is full. When the DWFT tenure has the high arbitration priority, the DWFT tenure can begin when a current tenure ends. A current tenure can be forced to terminate when the DWFT cache circuitry enters the enabled state.

The multi-channel bus can be a direct memory access (DMA) bus. The DWFT cache memory can be a First In First Out (FIFO) queue. The buffer memory can include a Double Data Rate (DDR) Random Access Memory (RAM) module.

In another example embodiment, a method is provided for interfacing with a moving storage medium partitioned into multiple data wedges and sectors. Access to a buffer memory via a multi-channel bus is arbitrated. DWFT (Data Wedge Format Table) entries stored in the buffer memory are read. The DWFT entries define the physical locations of the sectors of the storage medium. The DWFT entries are cached in a DWFT cache memory of a storage medium interface. Data is transferred to and from the storage medium through the storage medium interface. The storage medium interface accesses the sectors of the storage medium based on their physical locations, as defined by the cached DWFT entries. The multi-channel bus includes a DWFT channel to which DWFT cache circuitry is connected. Access to the buffer memory is arbitrated in sequential tenures to each channel of the multi-channel bus within an arbitration round-trip time. In a DWFT tenure for the DWFT channel, a DWFT process performed by the DWFT cache circuitry reads the DWFT entries stored in the buffer memory, and caches the DWFT entries in the DWFT cache memory.

A more complete understanding of the disclosure can be obtained by reference to the following detailed description in connection with the attached drawings.

DETAILED DESCRIPTION

Figure 1:
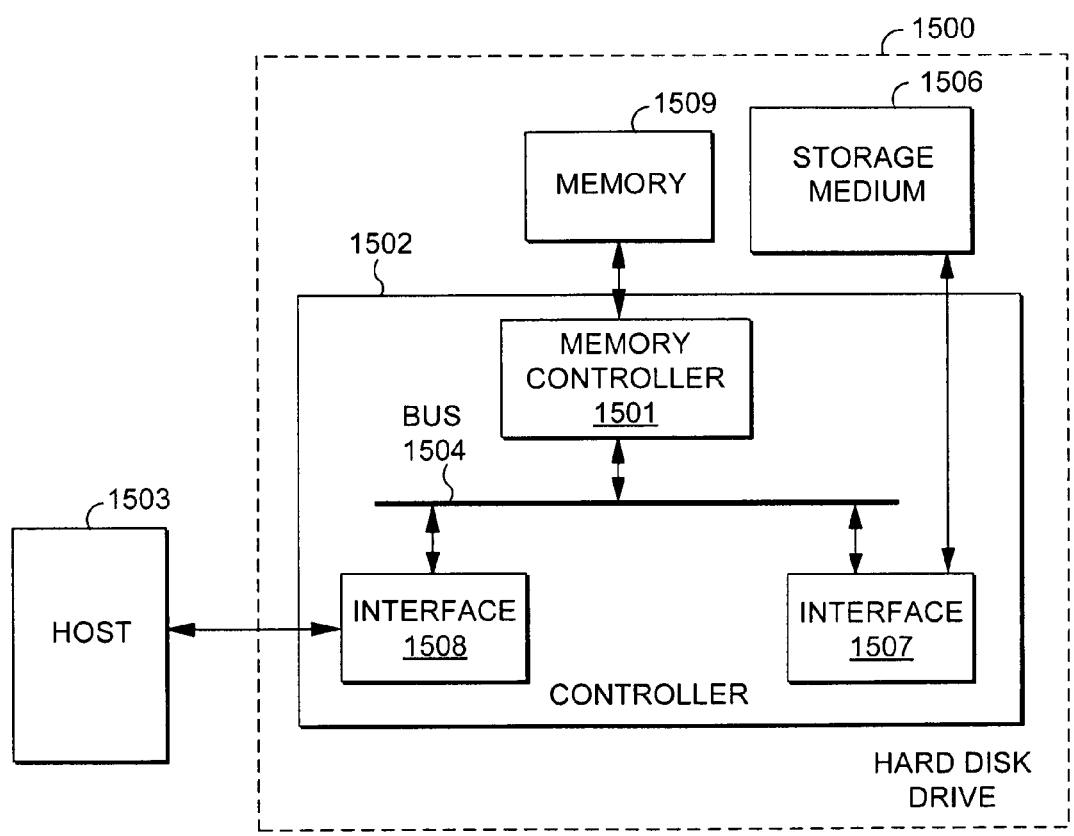
FIG. 1 is a block diagram of a conventional hard disk drive.
Figure 2:
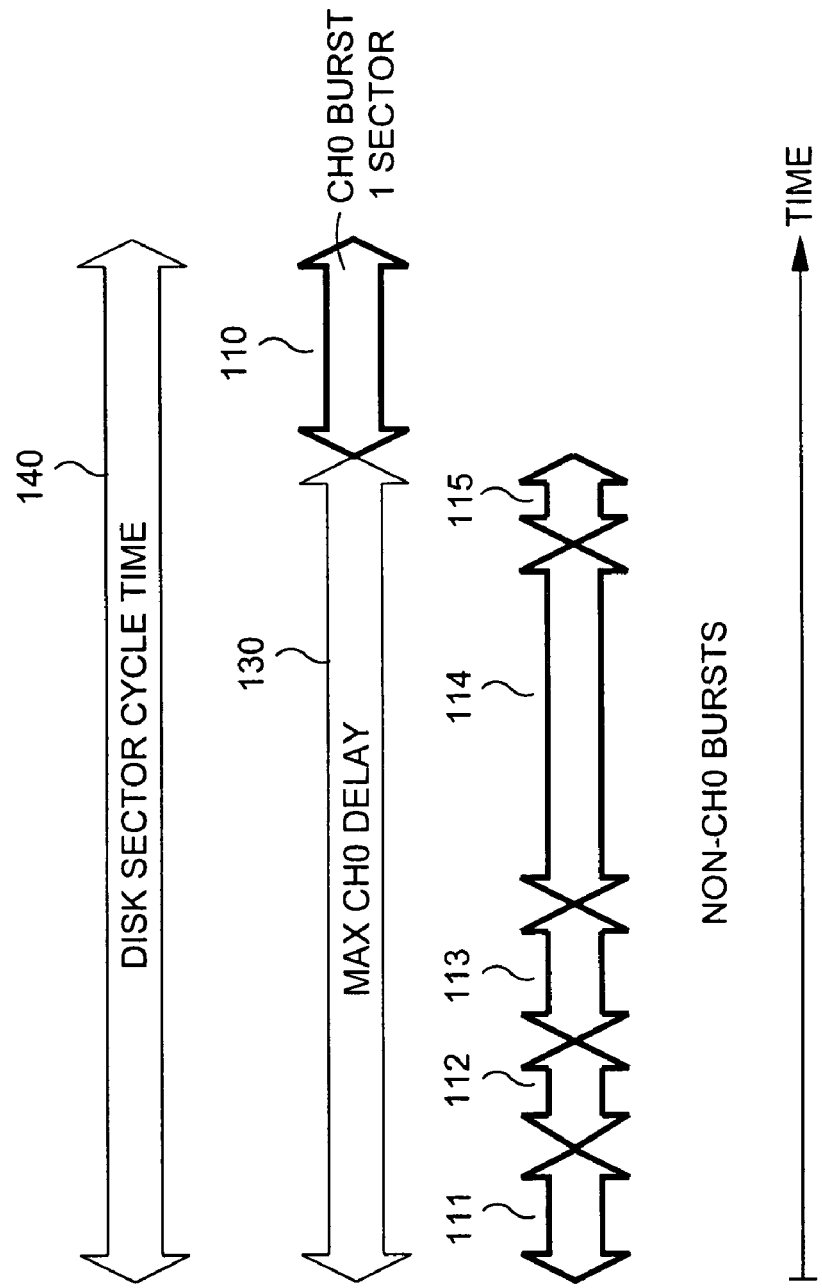
FIG. 2 is a time-line illustrating a conventional arbitration scheme in a hard disk drive.
Figure 3:
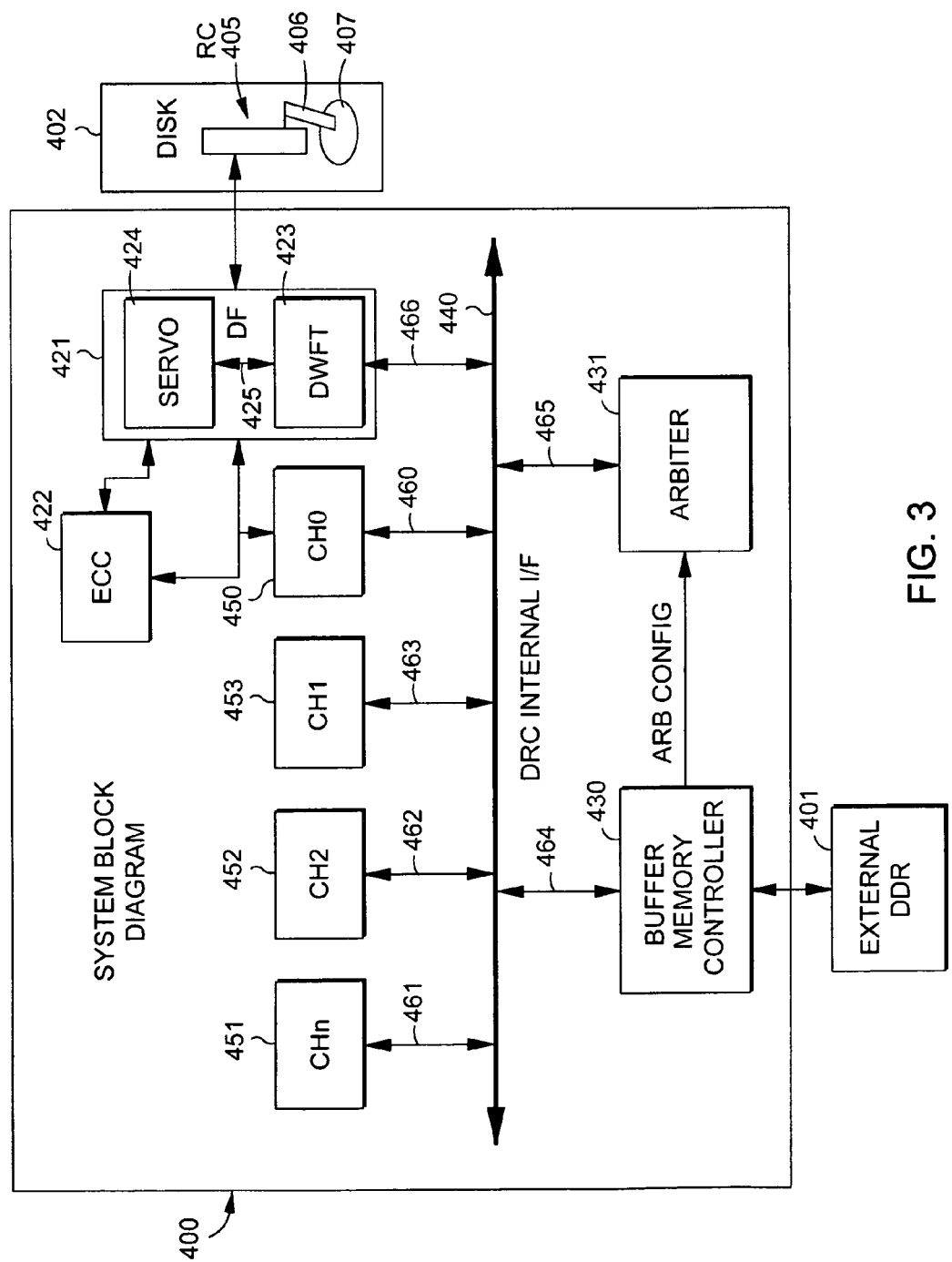
FIG. 3 is a block diagram of a storage device in accordance with an example embodiment of the invention.

FIG. 3 is a block diagram of a controller 400 for a storage device 402 in accordance with an example embodiment of the invention.

In one implementation, controller 400 is coupled to buffer memory 401 and storage device 402. Buffer memory 401 can be, for example, a double data rate random access memory (DDR-RAM), or any other suitable type of memory.

Storage device 402 can be, for example, a hard disk drive, an optical disk drive, a tape drive, or any other type of storage device in which data is stored on a storage medium that is partitioned into multiple data wedges and sectors. In the example embodiment, storage device 402 includes storage medium 407, read/write head assembly 406, and read channel (RC) 405. In one implementation, storage medium 407 comprises a magnetic storage medium that is partitioned into multiple data wedges and sectors. Data is read to and from storage medium 407 by read/write assembly 406, and then transferred to and from controller 400 through read channel 405.

In one implementation, controller 400 includes disk formatting (DF) circuitry 421, buffer memory controller 430, multi-channel bus 440, circuitry 450 to 453, arbiter 431, and Error Correcting Code (ECC) circuitry 422.

In one implementation, multi-channel bus 440 is a direct memory access (DMA) bus having five DMA channels 460 ("CH0"), 461 ("CHn"), 462 ("CH2"), 463 ("CH1"), and 466 ("DWFT"), in addition to a DMA controller channel 464 and arbiter channel 465.

Buffer memory controller 430 performs buffer control processes such as, for example, initializing buffer memory 401, processing commands stored in buffer memory 401, refreshing buffer memory 401, storing state information in buffer memory 401, and any other suitable buffer memory control processes. In one implementation, buffer memory controller 430 includes configuration registers for storing configuration information.

ECC circuitry 422 performs an ECC error recovery process for data transfers corresponding to multiple sectors of storage medium 407.

CH0 circuitry 450 performs a CH0 process to access buffer memory 401 on behalf of storage medium 407, and transfers data to and from buffer memory 401. In one implementation, CH0 circuitry 450 includes a queue (e.g., a First In First Out (FIFO) queue) (not shown) for temporarily storing data received from either storage medium 407 or buffer memory 401.

Circuitry 451 to 453 can perform, for example, processes for accessing buffer memory 401 on behalf of a host (e.g., a computer), or any other processes that require accessing buffer memory 401.

CH0 circuitry 450 is connected to CH0 DMA channel 460, disk formatting circuitry 421, and ECC circuitry 422. ECC circuitry 422 is connected to disk formatting circuitry 421. Disk formatting circuitry 421 is connected to read channel 405 of storage device 402, and DWFT DMA channel 466.

In one implementation, disk formatting (DF) circuitry 421 is a storage medium interface through which data to and from storage medium 407 is transferred. Disk formatting circuitry 421 includes DWFT cache circuitry 423 and servo circuitry 424. DWFT cache circuitry 423 and servo circuitry 424 communicate via servo interface 425. DWFT cache circuitry 423 is connected to DWFT channel 466. DWFT cache circuitry 423 is constructed to retrieve Data Wedge Format Table (DWFT) entries when transferring data corresponding to multiple sectors of storage medium 407 (i.e., during multi-sector bursts). The DWFT entries define the physical locations of the sectors of storage medium 407. The DWFT cache circuitry 423 includes a DWFT cache memory that stores the retrieved DWFT entries. This DWFT cache memory is depicted as DWFT cache memory 520 in FIG. 6, which depicts a more detailed block diagram of DWFT cache circuitry 423, as will be described in greater detail below.

Servo circuitry 424 transfers data to and from storage medium 407. Before accessing sectors of storage medium 407, servo circuitry 424 reads cached DWFT entries from DWFT cache circuitry 423 to determine the physical locations of the sectors corresponding to the data to be transferred.

Arbiter 431 performs an arbitration process that arbitrates access to buffer memory 401 via multi-channel bus 440. In one implementation, the arbitration process is configured based on arbitration configuration information received from buffer memory controller 430. The arbitration configuration information can be stored in configuration registers of buffer memory controller 430, or in any other suitable configuration registers included in controller 400.

In one implementation, arbiter 431 arbitrates access to buffer memory 401 by allocating sequential tenures (i.e., periods of time) to each of DMA channels 460 ("CH0"), 461 ("CHn"), 462 ("CH2"), 463 ("CH1"), and 466 ("DWFT") within an arbitration round-trip time. In one implementation, there are at most five tenures per arbitration round-trip, and the length of time for each tenure is specified in the configuration registers of buffer memory controller 430. After the last tenure in an arbitration round-trip expires, a new arbitration round-trip begins. The maximum time for each arbitration round-trip to complete is defined by the time taken by storage medium 407 to move a distance corresponding to N sectors, in which N is greater than one. In one implementation, the maximum time for each arbitration round-trip to complete is defined by the time taken by storage medium 407 to move a distance corresponding to four sectors.

In a disk read operation, before reading data from storage medium 407, servo circuitry 424 reads DWFT entries from the DWFT cache memory (e.g., DWFT cache memory 520 of FIG. 6) to determine the physical locations of the sectors corresponding to the data to be read. However, if the DWFT cache memory does not have valid DWFT entries for the sectors to be read, servo circuitry 424 waits for DWFT cache circuitry 423 to read the entries from buffer memory 401. DWFT cache circuitry 423 reads the entries during a tenure (i.e., a DWFT tenure) allocated to DWFT channel 466. During the DWFT tenure, DWFT cache circuitry 423 performs a DWFT process to read the DWFT entries from buffer memory 401 (via multi-channel bus 440 and buffer memory controller 430). This DWFT process caches the retrieved entries in the DWFT cache memory.

After the DWFT entries have been cached, servo circuitry 424 reads the cached DWFT entries from the DWFT cache memory. Servo circuitry 424 then instructs read/write assembly 406 to read data stored at the physical locations specified in the DWFT entries, and to transfer the data through read channel 405 to disk formatting circuitry 421.

In response, disk formatting circuitry 421 transfers the received data to CH0 circuitry 450, which stores the received data until the beginning of a tenure (i.e., a CH0 tenure) allocated to CH0 channel 460. During the CH0 tenure, CH0 circuitry 450 performs a CH0 burst process that transfers the received data to buffer memory 401 (through multi-channel bus 440 and buffer memory controller 430) in a multi-sector (e.g., four sector) burst.

During other tenures, (in one implementation) CH0 circuitry 450 and DWFT cache circuitry 423 operate independently. For example, DWFT cache circuitry 423 and CH0 circuitry 450 may continue receiving and storing data read from storage medium 407, provided that the DWFT cache memory (of DWFT cache circuitry 423) has DWFT entries for the sectors corresponding to the data to be read. In an implementation that performs four-sector bursts, for a read request of more than four sectors, disk formatting circuitry 421 continues transferring data received from read channel 405 to CH0 circuitry 450 until all the requested data is read from storage medium 407.

During a disk write operation, CH0 circuitry 450 performs a multi-sector burst process that reads the data stored in buffer memory 401 during a CH0 tenure. During other tenures, CH0 circuitry 450 performs processes that do not require accessing buffer memory 401, and may, for example, transfer the data read from buffer memory 401 to ECC circuitry 422 and disk formatting circuitry 421.

ECC circuitry 422 generates ECC information based on the data received from CH0 circuitry 450, and sends the generated ECC information to disk formatting circuitry 421. Disk formatting circuitry 421 appends the ECC information received from ECC circuitry 422 to the data received from CH0 circuitry 450.

Before writing the data (including appended ECC information) to storage medium 407, servo circuitry 424 reads DWFT entries from the DWFT cache memory (e.g., DWFT cache memory 520 of FIG. 6) to determine the physical locations on storage medium 407 to which data is to be written.

However, if the DWFT cache memory does not have valid DWFT entries for the sectors to be written, servo circuitry 424 waits for DWFT cache circuitry 423 to read the entries from buffer memory 401. DWFT cache circuitry 423 reads the entries during a tenure (i.e., a DWFT tenure) allocated to DWFT channel 466. During the DWFT tenure, DWFT cache circuitry 423 performs a DWFT process to read the DWFT entries from buffer memory 401 (via multi-channel bus 440 and buffer memory controller 430). This DWFT process caches the retrieved entries in the DWFT cache memory.

After the DWFT entries have been cached, servo circuitry 424 reads the cached DWFT entries from the DWFT cache memory. Servo circuitry 424 then transfers the data (which is received from buffer memory 401, and which includes the appended ECC information) to read/write assembly 406 through read channel 405. After transferring the data, servo circuitry 424 instructs read/write assembly 406 to write this data to storage medium 407 at the physical locations specified in the DWFT entries.

The disk write operation continues, with data being read from buffer memory 401 in successive CH0 tenures, until all the data to be transferred from buffer memory 401 has been written to storage medium 407.

Figure 4:
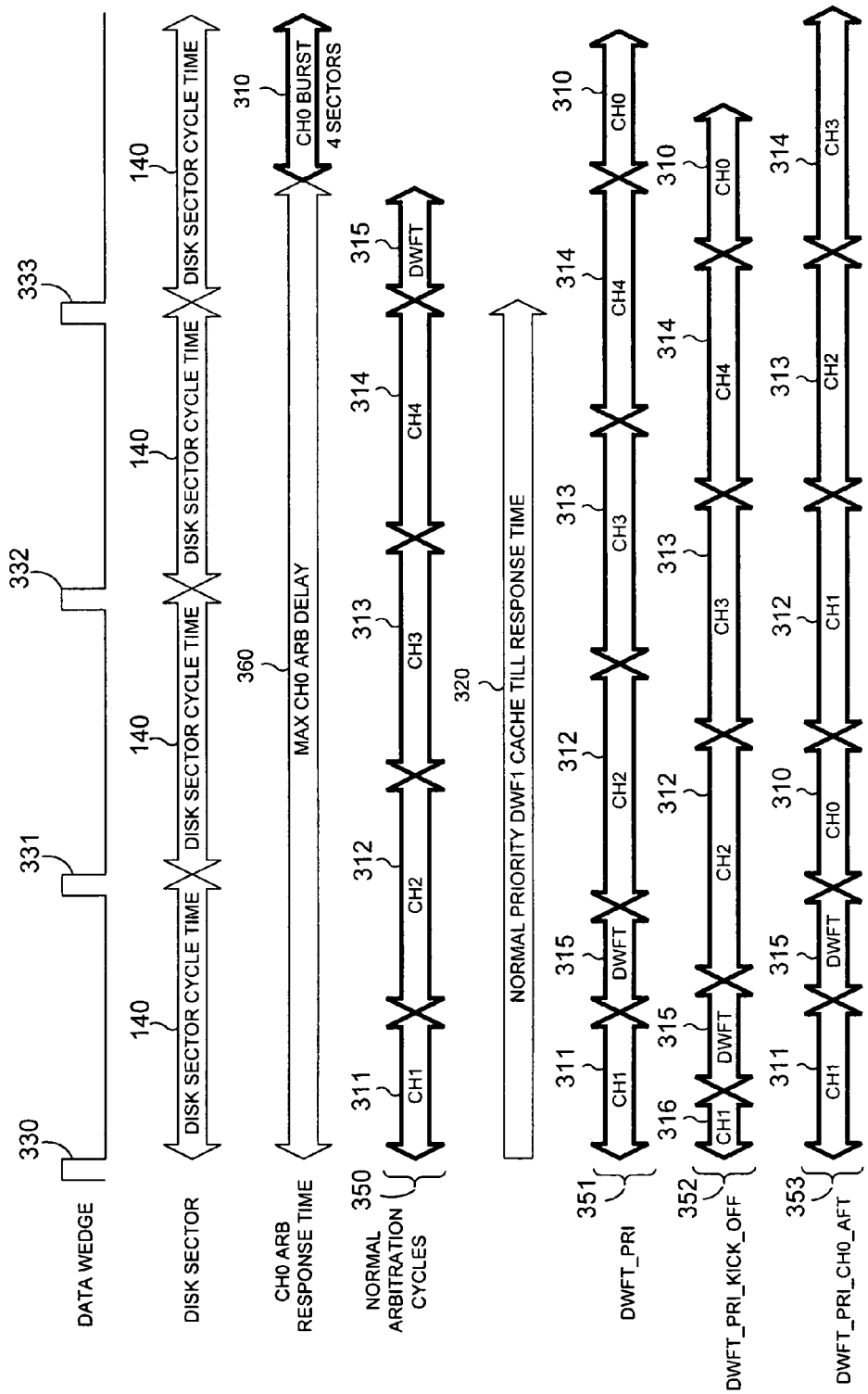
FIG. 4 is a time-line illustrating an arbitration algorithm in accordance with an example embodiment of the invention.

FIG. 4 is a time-line illustrating tenures within an arbitration round-trip, in accordance with an example embodiment of the invention. Each of time periods 140 represents the time during which a sector is accessed. At each of times 330 to 333 the beginning of a new data wedge is positioned under read/write assembly 406. Time period 360 represents the maximum delay between successive CH0 tenures 310.

As described above with respect to both read and write operations, if the DWFT cache memory does not have valid DWFT entries for the sectors to be accessed, the sectors cannot be accessed until DWFT cache circuitry 423 retrieves the DWFT entries during the DWFT tenure.

As shown in FIG. 4, during a normal arbitration cycle 350, the DWFT tenure (e.g., DWFT tenure 315) may not begin until tenures 311 to 314 have completed. DWFT cache fill response time 320 corresponds to an amount of time servo circuitry 424 waits before receiving DWFT entries from the DWFT cache memory when the DWFT cache memory does not contain valid entries. The DWFT cache fill response time 320 corresponds to the time allocated to each of the tenures preceding the DWFT tenure.

According to an aspect of the invention, the DWFT cache fill response time 320 can be reduced by assigning the DWFT tenure a high arbitration priority during the initial cache fill. Because the DWFT cache is initially filled with enough DWFT entries to compensate for the DWFT cache fill response time 320, the arbitration priority of the DWFT tenure can be configured so that after the initial filling of the DWFT cache memory, the DWFT tenure has a normal arbitration priority.

In an implementation that performs four-sector bursts, caching eight DWFT entries during the initial cache fill has been determined to compensate for the DWFT cache fill response time 320. However, in other implementations, a different number of DWFT entries may be cached during each cache fill.

The arbitration priority of DWFT tenure 315 can be configured according to different priority modes, as specified by the configuration registers of buffer memory controller 430.

The different priority modes configurable through the configuration registers of buffer memory controller 430, according to one implementation, are listed below in Table 1:

| | |
|---|---|
| Priority Mode 1 | DWFT tenure priority configuration is disabled. |
| Priority Mode 2 | The DWFT tenure has a normal priority. |
| Priority Mode 3 | The DWFT tenure begins when the current tenure ends. The current tenure ends normally. The arbitration cycle is not reset after the DWFT tenure, and the next tenure is the tenure that would have followed the tenure preceding the DWFT tenure. |
| Priority Mode 4 | The DWFT tenure begins when the current tenure ends. The current tenure is forced to terminate. The arbitration cycle is not reset after the DWFT tenure, and the next tenure is the tenure that would have followed the tenure preceding the DWFT tenure. |
| Priority Mode 5 | The DWFT tenure begins when the current tenure ends. The current tenure is forced to terminate. The arbitration cycle is reset after the DWFT tenure, wherein the CH0 tenure is made the highest priority requester, and thereafter arbitration continues with the next highest requestor after the CH0 tenure. |
| Priority Mode 6 | The DWFT tenure begins when the current tenure ends. The current tenure ends normally. The arbitration cycle is reset after the DWFT tenure, wherein the CH0 tenure is made the highest priority requester, and thereafter arbitration continues with the next highest requestor after the CH0 tenure. |

Arbitration cycle 351 depicts an arbitration cycle in which the arbitration priority of DWFT tenure 315 is configured according to Priority Mode 3 of Table 1. Arbitration cycle 353 depicts an arbitration cycle in which the arbitration priority of DWFT tenure 315 is configured according to Priority Mode 6 of Table 1. Arbitration cycle 352 depicts an arbitration cycle in which the arbitration priority of DWFT tenure 315 is configured according to Priority Mode 4 of Table 1.

As illustrated, the CH1 tenure 316 (of arbitration cycle 352) is shorter than the CH1 tenure 311 (as illustrated in relation to arbitration cycles 350, 351, and 353) to reflect the fact that in Priority Mode 1, the current tenure (e.g., CH1) is forced to terminate when DWFT cache circuitry 423 requests access to buffer memory 401.

As illustrated in FIG. 4, with respect to arbitration cycles 351 to 353, the DWFT tenure 315 can have an arbitration priority that is higher than the arbitration priority of the CH0 tenure 310.

Figure 5:
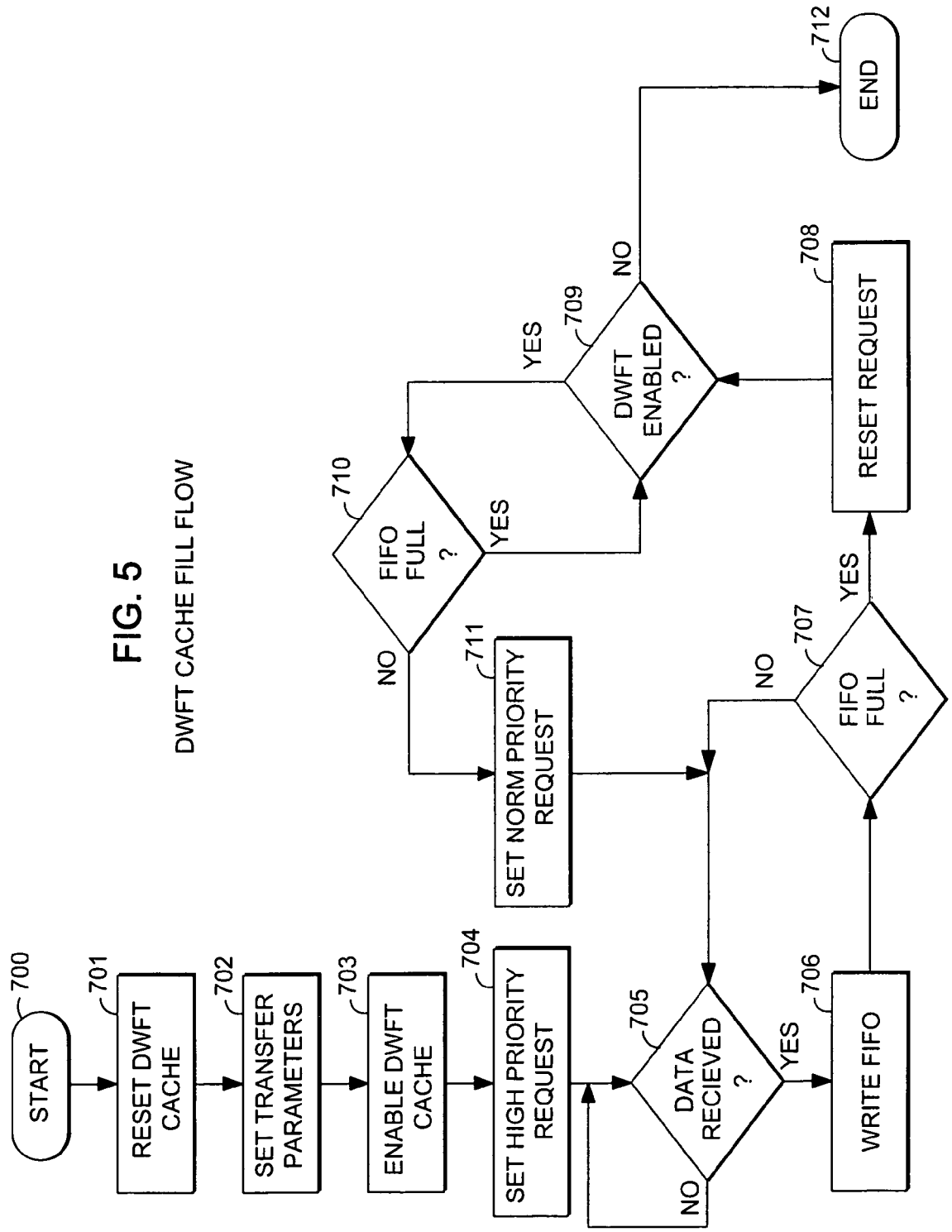
FIG. 5 is a flowchart depicting a process of caching DWFT (Data Wedge Format Table) entries in accordance with an example embodiment of the invention.

FIG. 5 is a flowchart depicting a process of caching DWFT entries, in accordance with one implementation. At block 700, controller 400 begins to perform a process for transferring data to or from storage medium 407. At block 701, controller 400 resets the DWFT cache memory. At block 702, transfer parameters for transferring DWFT entries from buffer memory 401 to the DWFT cache memory are set via firmware. The transfer parameters can include memory addresses indicating the locations, within buffer memory 401, of the DWFT entries to be transferred. The arbitration priority mode of the DWFT tenure (e.g., one of the priority modes listed in Table 1) is also configured via firmware, at block 702. At block 703, controller 400 enables the DWFT cache circuitry 423.

At block 704, DWFT cache circuitry 423 automatically sets a high priority DWFT request. After the high priority DWFT request is set, DWFT cache circuitry 423 requests access to buffer memory 401, thereby initiating the DWFT tenure.

At block 705, DWFT cache circuitry 423 determines whether DWFT entries have been received from buffer memory 401. If DWFT entries have not been received from buffer memory 401 ("NO" at block 705), then DWFT cache circuitry 423 waits for DWFT entries to be received. If DWFT entries have been received from buffer memory 401 ("YES" at block 705), then at block 706, DWFT cache circuitry 423 writes the received DWFT entries to the DWFT cache memory (e.g., First In First Out (FIFO) memory).

After the received DWFT entries have been written to the DWFT cache memory, DWFT cache circuitry 423 determines whether the DWFT cache memory is full, at block 707. If the DWFT cache memory is not full ("NO" at block 707), then DWFT cache circuitry 423 waits for additional DWFT entries to be received at block 705. If the DWFT cache memory is full ("YES" at block 707), then at block 708, DWFT cache circuitry 423 resets the request to access buffer memory 401, thereby ending the DWFT tenure. Thereafter, if the DWFT cache circuitry 423 is disabled ("NO" at block 709), the caching process terminates at block 712.

If the DWFT cache circuitry 423 is enabled ("YES" at block 709), DWFT cache circuitry 423 determines whether the DWFT cache memory is full, at block 710. If the DWFT cache memory is full ("YES" at block 710), then DWFT cache circuitry 423 waits until the DWFT cache memory is not full. If the DWFT cache memory is not full ("NO" at block 710), then at block 711, DWFT cache circuitry 423 automatically sets a normal priority DWFT request. After the arbitration priority of the DWFT tenure is set to a normal priority, DWFT cache circuitry 423 requests access to buffer memory 401, thereby initiating another DWFT tenure during which DWFT cache circuitry 423 retrieves DWFT entries at block 705.

Figure 6:
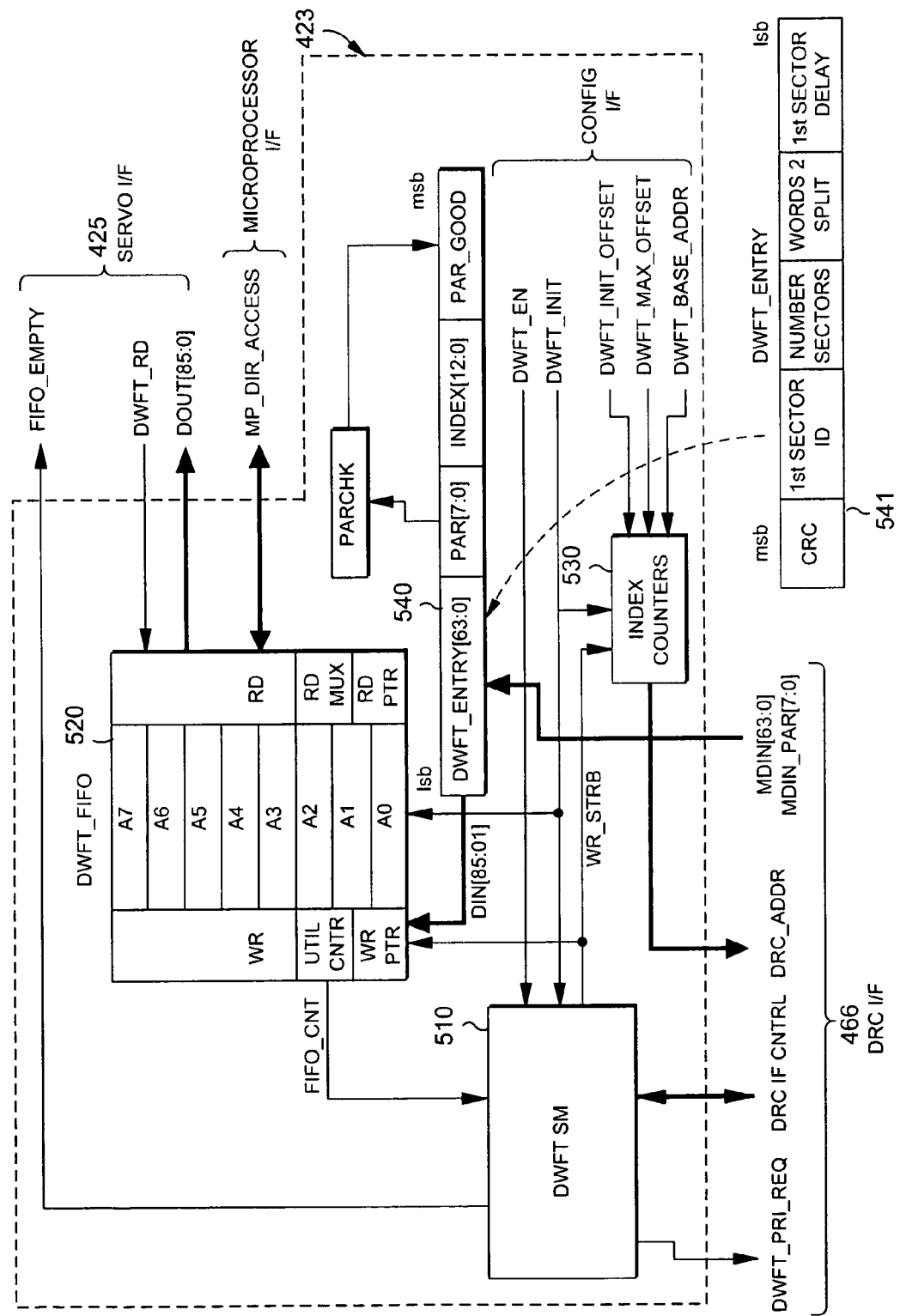
FIG. 6 is a block diagram of DWFT cache circuitry in accordance with an example embodiment of the invention.

FIG. 6 is a more detailed block diagram of DWFT cache circuitry 423, as depicted in FIG. 3, and as described above. In one implementation, DWFT cache circuitry 423 includes DWFT cache memory DWFT FIFO 520 and DWFT State Machine (SM) 510. In one implementation, DWFT cache memory 520 is a First In First Out (FIFO) queue), but in other implementations, DWFT cache memory 520 can be any other suitable cache memory. DWFT State Machine 510 performs the DWFT process as described above.

DWFT_PRI_REQ, DRC IF CNTRL, DRC_ADDR, MDIN, and MDIN_PAR represent signals and data transferred between buffer memory controller 430 and DWFT cache circuitry 423, via DWFT channel 466. DWFT_PRI_REQ sets the priority mode of the DWFT tenure. DRC IF CNTRL controls the transfer of data between DWFT cache circuitry 423 and buffer memory 401 (via multi-channel bus 440 and buffer memory controller 430). DRC_ADDR specifies the memory address, within buffer memory 401, of the DWFT entries to be transferred. DRC_ADDR is specified according the registers DWFT_INIT_OFFSET, DWFT_MAX_OFFSET, and DWFT_BASE_ADDR. DWFT_BASE_ADDR indicates the base address (start) of a circular buffer within buffer memory 401. DWFT_MAX_OFFSET represents the maximum offset from the base address (e.g., the end of the circular buffer). DWFT_INIT_OFFSET represents the initial offset, or current position within the circular buffer.

MDIN and MDIN_PAR represent data received from buffer memory 401. MDIN represents a DWFT entry, and MDIN_PAR represents parity bits corresponding to the DWFT entry. The format of a DWFT entry is illustrated by DWFT_ENTRY 541. DIN 540 represents a cache entry that is stored in DWFT cache memory 520 for each received DWFT entry 541. As illustrated, a DWFT cache entry 540 includes the DWFT entry 541, parity bits, and DRC_ADDR formed by index counters 530. In addition, a parity check is performed, based on parity bits MDIN_PAR, and the result (PAR_GOOD) is included in the cache entry 540.

FIFO_EMPTY, DWFT_RD, and DOUT represent signals and data transferred between servo circuitry 424 and DWFT cache circuitry 423, via servo interface 425. FIFO_EMPTY indicates that DWFT cache memory 520 is empty. DWFT_RD represents a cache read request from servo circuitry 424. In response to receiving read request signal DWFT_RD, DWFT cache circuitry 423 sends servo circuitry 424 the requested DWFT entry via DOUT.

DWFT state machine 510 receives a DWFT_INIT signal for initializing and resetting the DWFT cache circuitry 423. DWFT state machine 510 also receives a DWFT_EN signal for enabling the DWFT cache circuitry 423. DWFT state machine 510 also receives signal FIFO_CNT from DWFT cache memory 520, which indicates whether DWFT cache memory 520 is full.

Figure 7A:
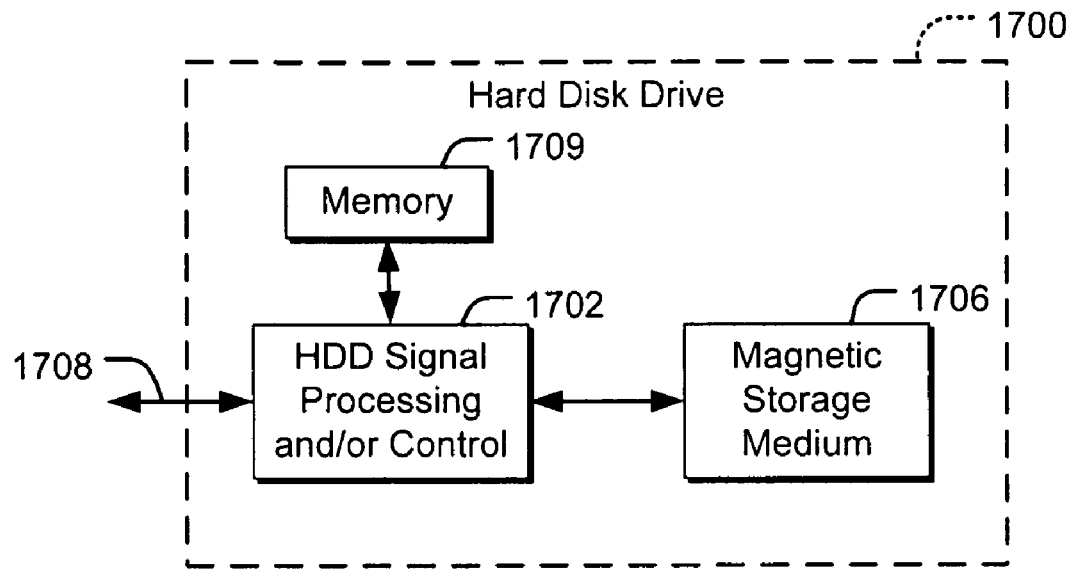
FIG. 7A is a block diagram of an embodiment of the invention in a hard disk drive (HDD).

Referring now to FIGS. 7A-7H, various exemplary implementations of the present invention are shown. Referring to FIG. 7A, the present invention may be embodied as a controller in a hard disk drive (HDD) 1700. The present invention may implement either or both signal processing and/or control circuits, which are generally identified in FIG. 7A at 1702. In some implementations, signal processing and/or control circuit 1702 and/or other circuits (not shown) in HDD 1700 may process data, perform coding and/or encryption, perform calculations, and/or format data that is output to and/or received from a magnetic storage medium 1706.

HDD 1700 may communicate with a host device (not shown) such as a computer, mobile computing devices such as personal digital assistants, cellular phones, media or MP3 players and the like, and/or other devices via one or more wired or wireless communication links 1708. HDD 1700 may be connected to memory 1709, such as random access memory (RAM), a low latency nonvolatile memory such as flash memory, read only memory (ROM) and/or other suitable electronic data storage.

Figure 7B:
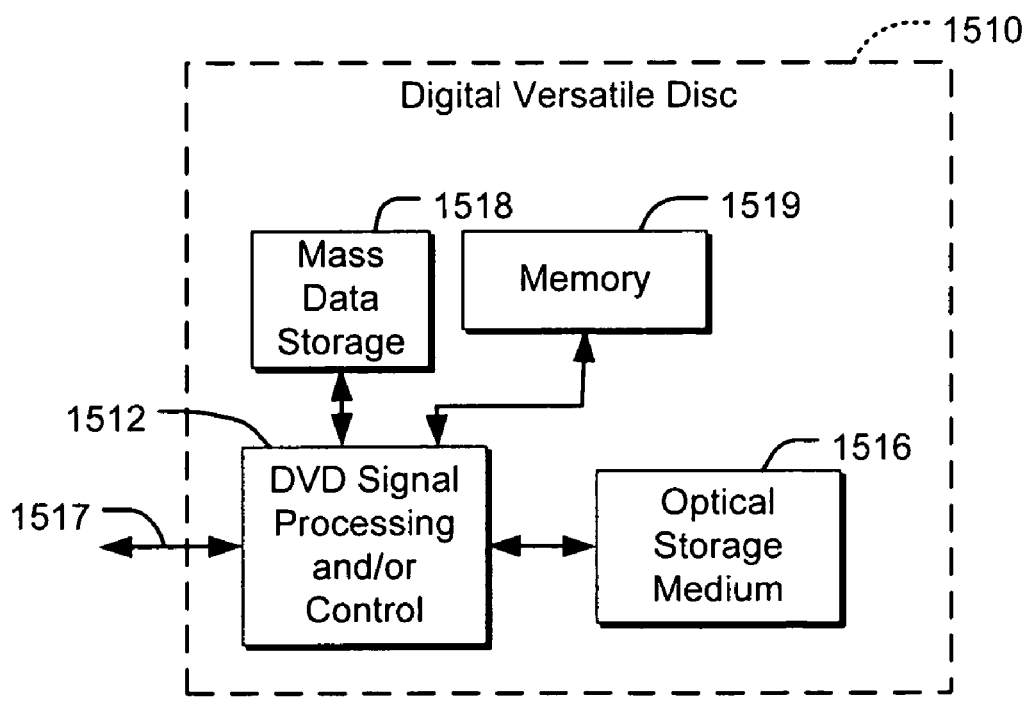
FIG. 7B is a block diagram of an embodiment of the invention in a digital versatile disc (DVD) drive.

Referring now to FIG. 7B, the present invention may be embodied as a controller in a digital versatile disc (DVD) drive 1510. The present invention may implement either or both signal processing and/or control circuits, which are generally identified in FIG. 7B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 7A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 7C:
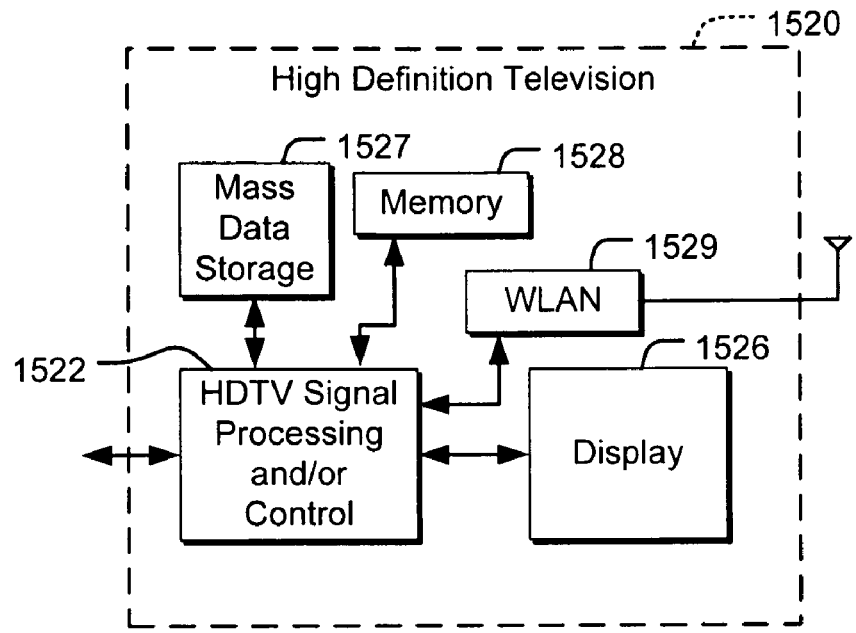
FIG. 7C is a block diagram of an embodiment of the invention in a high definition television (HDTV).

Referring now to FIG. 7C, the present invention may be embodied as a controller in a high definition television (HDTV) 1520. The present invention may implement either or both signal processing and/or control circuits, which are generally identified in FIG. 7C at 1522, a WLAN network interface 1529 and/or mass data storage 1527 of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN network interface 1529.

Figure 7D:
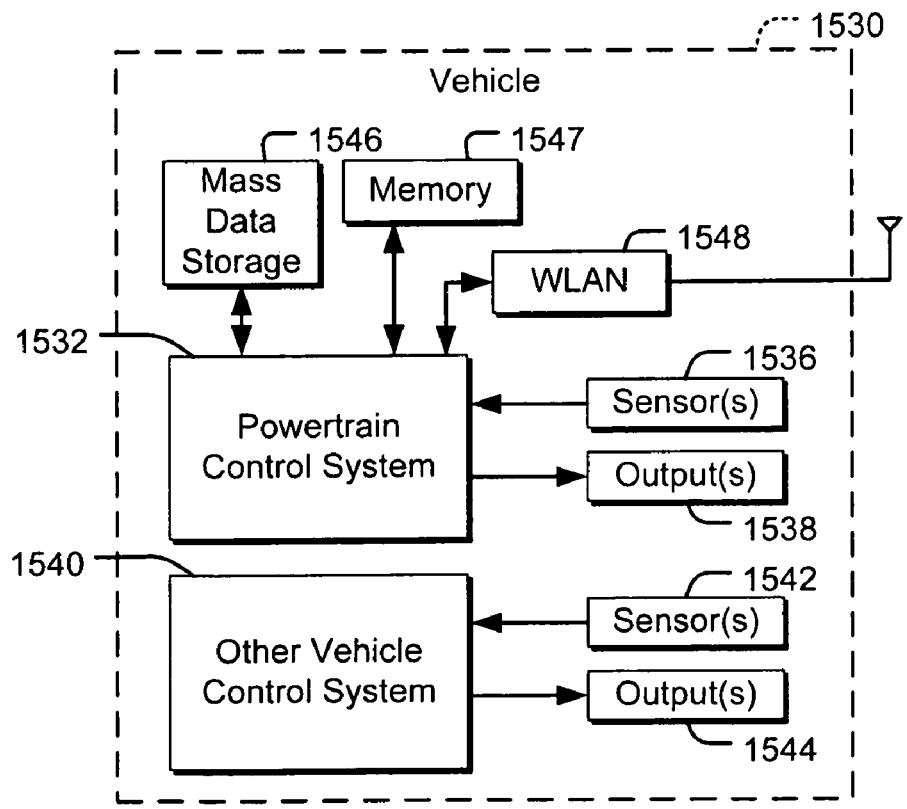
FIG. 7D is a block diagram of an embodiment of the invention in a vehicle.

Referring now to FIG. 7D, the present invention may be embodied as a controller in a control system of a vehicle 1530, a WLAN network interface 1548 and/or mass data storage 1546 of the vehicle 1530. In some implementations, the present invention implements a powertrain control system 1532 that receives inputs from one or more sensors 1536 such as temperature sensors, pressure sensors, rotational sensors, airflow sensors and/or any other suitable sensors and/or that generates one or more output control signals 1538 such as engine operating parameters, transmission operating parameters, braking parameters, and/or other control signals.

The present invention may also be embodied in an other control system 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN network interface 1548. The control system 1540 may also include mass data storage, memory and/or a WLAN network interface (all not shown).

Figure 7E:
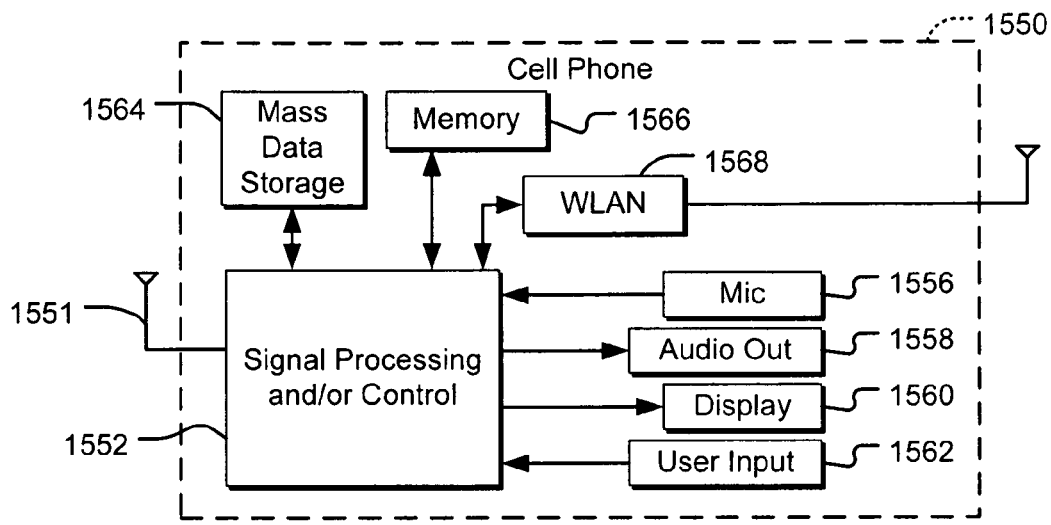
FIG. 7E is a block diagram of an embodiment of the invention in a cellular or mobile phone.

Referring now to FIG. 7E, the present invention may be embodied as a controller in a cellular phone 1550 that may include a cellular antenna 1551. The present invention may implement either or both signal processing and/or control circuits, which are generally identified in FIG. 7E at 1552, a WLAN network interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices, for example, hard disk drives and/or DVD drives. At least one HDD may have the configuration shown in FIG. 5A and/or at least one DVD drive may have the configuration shown in FIG. 7B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN network interface 1568.

Figure 7F:
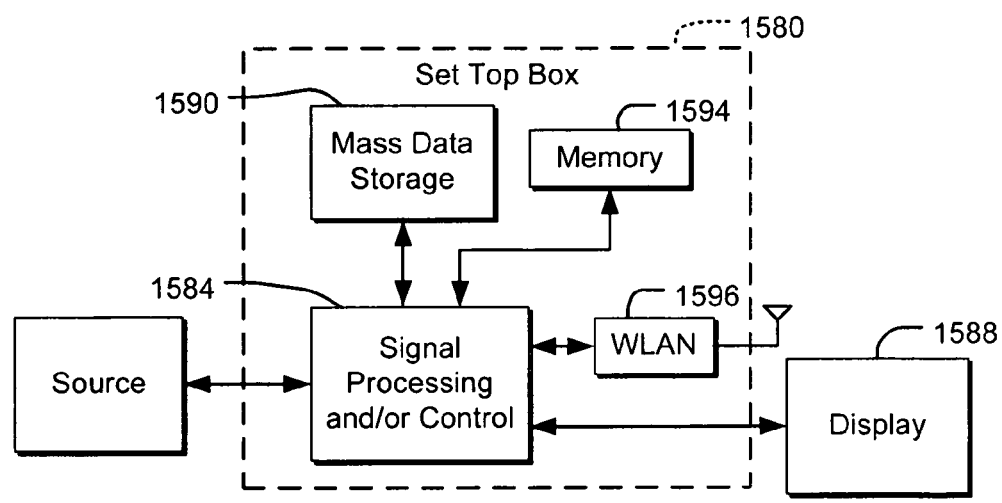
FIG. 7F is a block diagram of an embodiment of the invention in a set-top box.

Referring now to FIG. 7F, the present invention may be embodied as controller in a set top box 1580. The present invention may implement either or both signal processing and/or control circuits, which are generally identified in FIG. 7F at 1584, a WLAN network interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN network interface 1596.

Figure 7G:
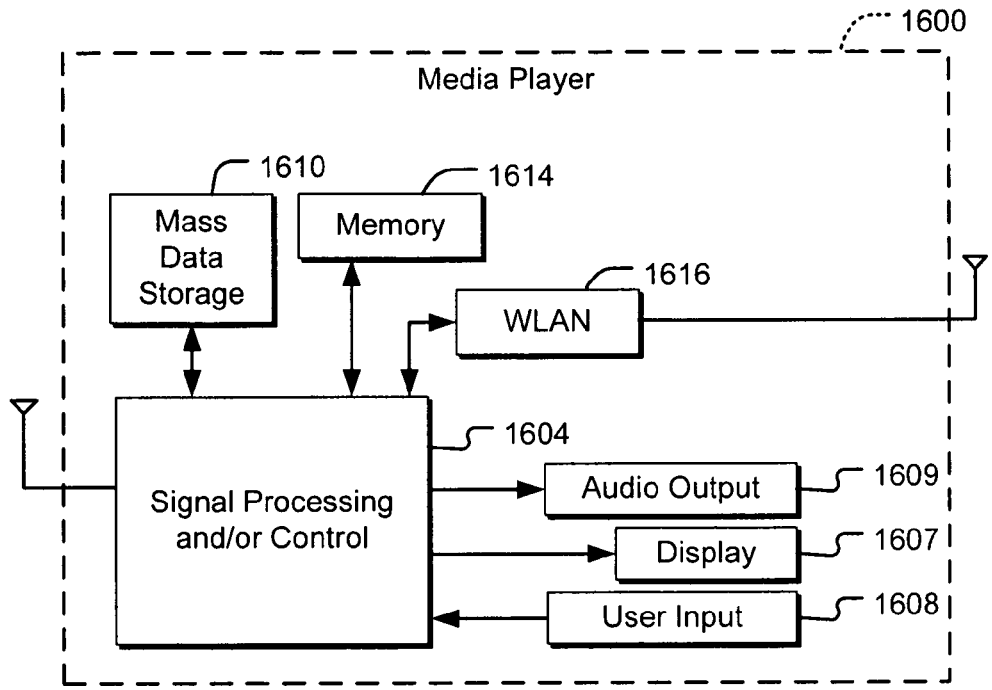
FIG. 7G is a block diagram of an embodiment of the invention in a media player.

Referring now to FIG. 7G, the present invention may be embodied as a controller in a media player 1600. The present invention may implement either or both signal processing and/or control circuits, which are generally identified in FIG. 7G at 1604, a WLAN network interface 1616 and/or mass data storage 1610 of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via WLAN network interface 1616. Still other implementations in addition to those described above are contemplated.

Figure 7H:
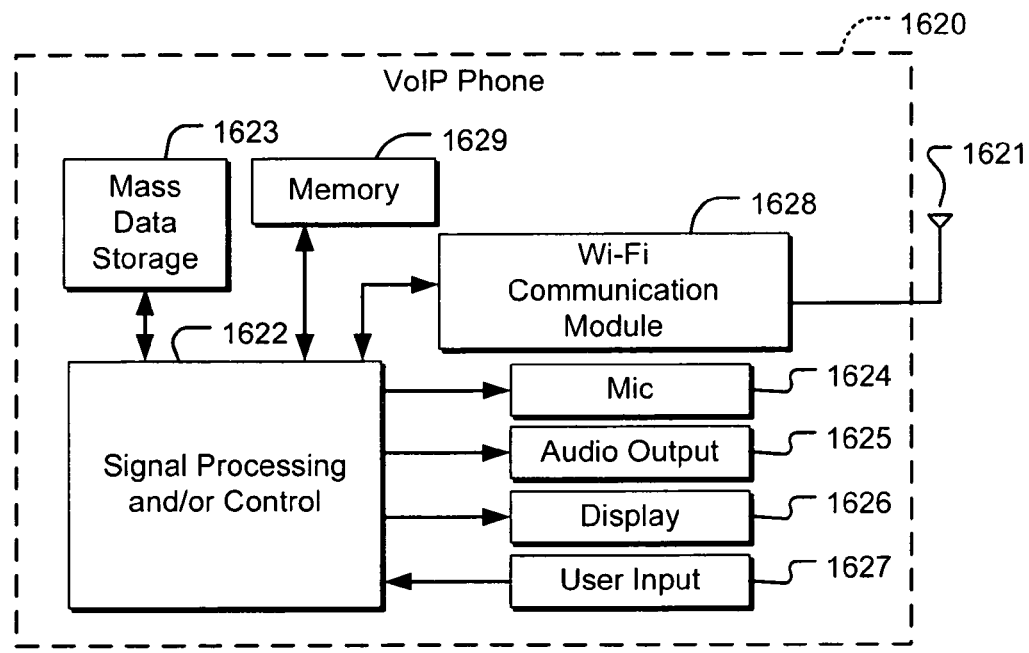
FIG. 7H is a block diagram of an embodiment of the invention in a Voice over Internet Protocol (VoIP) phone.

Referring to FIG. 7H, the present invention may be embodied as a controller in a Voice over Internet Protocol (VoIP) phone 1620 that may include an antenna 1621. The present invention may implement either or both signal processing and/or control circuits, which are generally identified in FIG. 7H at 1622, a wireless interface and/or mass data storage 1623 of the VoIP phone 1620. In some implementations, VoIP phone 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP phone 1620 may process data, perform coding and/or encryption, perform calculations, format data and/or perform other VoIP phone functions.

VoIP phone 1620 may communicate with mass data storage 1623 that stores data in a nonvolatile manner such as optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". VoIP phone 1620 may be connected to memory 1629, which may be a RAM, ROM, low latency nonvolatile memory such as flash memory and/or other suitable electronic data storage. VoIP phone 1620 is configured to establish communications link with a VoIP network (not shown) via Wi-Fi communication module 1628.

The exemplary embodiments of the invention have been described above with respect to particular illustrative embodiments, however, various changes and modifications may be made without departing from the scope of the invention. For example, in general, steps of methods described above may be performed in a different order and still achieve desirable results.

What is claimed is:

1. A controller for interfacing with a storage medium, the storage medium being partitioned into multiple data wedges and sectors, the controller comprising:
   a buffer controller to arbitrate access to a buffer memory via a multi-channel bus;
   a storage medium interface through which data to and from the storage medium is transferred, the storage medium interface including DWFT (Data Wedge Format Table) cache circuitry having a DWFT cache memory to cache DWFT entries, the storage medium interface to access the sectors of the storage medium based on physical locations of the sectors, as defined by the DWFT entries cached within the DWFT cache memory;
   wherein the multi-channel bus includes a DWFT channel to which the DWFT cache circuitry is connected; and
   wherein in a DWFT tenure for the DWFT channel, a DWFT process performed by the DWFT cache circuitry reads DWFT entries stored in the buffer memory, and caches the DWFT entries in the DWFT cache memory.

2. The controller of claim 1, wherein the multi-channel bus includes a CH0 channel to which CH0 circuitry is connected, and wherein in a CH0 tenure for the CH0 channel, a CH0 process performed by the CH0 circuitry accesses the buffer memory on behalf of the storage medium, and transfers data between the storage medium and the buffer memory.

3. The controller of claim 2, wherein an arbitration priority of the DWFT tenure is configurable so that for an initial filling of the DWFT cache memory, the arbitration priority of the DWFT tenure is higher than an arbitration priority of the CH0 tenure.

4. The controller of claim 3, wherein after the DWFT tenure ends, the arbitration priority of the CH0 tenure is a highest priority.

5. The controller of claim 1, wherein an arbitration priority of the DWFT tenure is configurable so that for an initial filling of the DWFT cache memory, the DWFT tenure has a high arbitration priority, and after the initial filling, the DWFT tenure has a normal arbitration priority.

6. The controller of claim 5, wherein when the DWFT tenure has the high arbitration priority, the DWFT tenure begins when a current tenure ends.

7. The controller of claim 5, wherein the DWFT cache circuitry has a disabled state and an enabled state, the initial filling of the DWFT cache memory begins when the DWFT cache circuitry enters the enabled state and reads DWFT entries from the buffer memory, and the initial filling ends when the DWFT cache memory is full.

8. The controller of claim 7, wherein a current tenure is forced to terminate when the DWFT cache circuitry enters the enabled state.

9. The controller of claim 1, wherein the multi-channel bus is a direct memory access (DMA) bus.

10. The controller of claim 1, wherein the DWFT cache memory is a First In First Out (FIFO) queue.

11. The controller of claim 1, wherein the buffer memory comprises a Double Data Rate (DDR) Random Access Memory (RAM) module.

12. The controller of claim 1, wherein access to the buffer memory is arbitrated in sequential tenures to each channel of the multi-channel bus within an arbitration round-trip time.

13. A method for interfacing with a storage medium, the storage medium being partitioned into multiple data wedges and sectors, the method comprising:
   arbitrating access to a buffer memory via a multi-channel bus;
   reading DWFT (Data Wedge Format Table) entries stored in the buffer memory, the DWFT entries defining physical locations of the sectors of the storage medium;
   caching the DWFT entries in a DWFT cache memory of a storage medium interface;
   transferring data to and from the storage medium through the storage medium interface, wherein the storage medium interface accesses the sectors of the storage medium based on the physical locations of the sectors, as defined by the cached DWFT entries;
   wherein the multi-channel bus includes a DWFT channel to which DWFT cache circuitry is connected; and
   wherein in a DWFT tenure for the DWFT channel, a DWFT process performed by the DWFT cache circuitry reads the DWFT entries stored in the buffer memory, and caches the DWFT entries in the DWFT cache memory.

14. The method of claim 13, wherein the multi-channel bus includes a CH0 channel to which CH0 circuitry is connected, and wherein in a CH0 tenure for the CH0 channel, a CH0 process performed by the CH0 circuitry accesses the buffer memory on behalf of the storage medium, and transfers data between the storage medium and the buffer memory.

15. The method of claim 14, wherein an arbitration priority of the DWFT tenure is configurable so that for an initial filling of the DWFT cache memory, the arbitration priority of the DWFT tenure is higher than an arbitration priority of the CH0 tenure.

16. The method of claim 15, wherein after the DWFT tenure ends, the arbitration priority of the CH0 tenure is a highest priority.

17. The method of claim 13, wherein an arbitration priority of the DWFT tenure is configurable so that for an initial filling of the DWFT cache memory, the DWFT tenure has a high arbitration priority, and after the initial filling, the DWFT tenure has a normal arbitration priority.

18. The method of claim 17, wherein when the DWFT tenure has the high arbitration priority, the DWFT tenure begins when a current tenure ends.

19. The method of claim 17, wherein the DWFT cache circuitry has a disabled state and an enabled state, the initial filling of the DWFT cache memory begins when the DWFT cache circuitry enters the enabled state and reads DWFT entries from the buffer memory, and the initial filling ends when the DWFT cache memory is full.

20. The method of claim 19, wherein a current tenure is forced to terminate when the DWFT cache circuitry enters the enabled state.

21. The method of claim 13, wherein access to the buffer memory is arbitrated in sequential tenures to each channel of the multi-channel bus within an arbitration round-trip time.

* * * * *